United States Patent
Kitchen et al.

(10) Patent No.: US 8,407,090 B2
(45) Date of Patent: *Mar. 26, 2013

(54) DYNAMIC REASSIGNMENT OF ADVERTISEMENT PLACEMENTS TO MAXIMIZE IMPRESSION COUNT

(75) Inventors: Garry Kitchen, Franklin Lakes, NJ (US); Brian Thorp, Ramsey, NJ (US)

(73) Assignee: Skyworks Ventures, Inc., Glen Head, NY (US)

( * ) Notice: Subject to any disclaimer, the term of this patent is extended or adjusted under 35 U.S.C. 154(b) by 414 days.

This patent is subject to a terminal disclaimer.

(21) Appl. No.: 12/606,232

(22) Filed: Oct. 27, 2009

(65) Prior Publication Data

US 2010/0131355 A1 May 27, 2010

Related U.S. Application Data

(60) Provisional application No. 61/117,741, filed on Nov. 25, 2008.

(51) Int. Cl.
*G06Q 30/00* (2012.01)

(52) U.S. Cl. .......... 705/14.4; 705/14.12; 705/14.43; 705/14.68; 705/14.73

(58) Field of Classification Search .......... None
See application file for complete search history.

(56) References Cited

U.S. PATENT DOCUMENTS

| | | | |
|---|---|---|---|
| 6,473,720 | B1 | 10/2002 | Hampson |
| 6,758,746 | B1 | 7/2004 | Hunter |
| 7,729,946 | B2 | 6/2010 | Chu |
| 8,156,004 | B2 * | 4/2012 | Wajihuddin .......... 705/14.5 |
| 2002/0133397 | A1 * | 9/2002 | Wilkins .......... 705/14 |
| 2004/0015608 | A1 * | 1/2004 | Ellis et al. .......... 709/246 |
| 2004/0043806 | A1 | 3/2004 | Kirby et al. |
| 2004/0143495 | A1 | 7/2004 | Koenig |
| 2004/0143852 | A1 | 7/2004 | Meyers |
| 2004/0167928 | A1 * | 8/2004 | Anderson et al. .......... 707/104.1 |
| 2004/0193441 | A1 | 9/2004 | Altieri |
| 2005/0216346 | A1 | 9/2005 | Kusumoto et al. |
| 2006/0052891 | A1 | 3/2006 | Ikeda et al. |
| 2006/0105841 | A1 | 5/2006 | Rom et al. |

(Continued)

FOREIGN PATENT DOCUMENTS

| | | |
|---|---|---|
| WO | WO 00/67473 | 11/2000 |
| WO | WO 2004/042525 | 5/2004 |

(Continued)

OTHER PUBLICATIONS

Bashford, Suzy "the Revolution Mastercalss on in-game advertising" Revolution. London: Apr. 2006, p. 82.

(Continued)

*Primary Examiner* — Matthew T Sittner
(74) *Attorney, Agent, or Firm* — Leason Ellis LLP

(57) ABSTRACT

A method for dynamically reassigning in-game advertisements within a video game in order to maximize impression counts for the advertisements includes the steps of: determining when an advertisement at a first view location qualifies as on screen and incrementing an elapsed time for the advertisement while it qualifies as on screen. The method also includes the steps of calculating a current impression count for the advertisement and determining whether a maximum impression count for the advertisement has been reached or is within a prescribed value of being reached. If so, another advertisement is dynamically assigned to the first view location by removing the initial advertisement therefrom in order to maximize the cumulative impression counts for the advertisements.

20 Claims, 5 Drawing Sheets

U.S. PATENT DOCUMENTS

| | | | |
|---|---|---|---|
| 2006/0135232 A1* | 6/2006 | Willis | 463/1 |
| 2006/0135233 A1* | 6/2006 | Willis et al. | 463/1 |
| 2007/0043616 A1 | 2/2007 | Kutaragi et al. | |
| 2007/0061204 A1 | 3/2007 | Ellis et al. | |
| 2007/0072676 A1 | 3/2007 | Baluja | |
| 2008/0046924 A1* | 2/2008 | Hood | 725/36 |
| 2008/0102947 A1* | 5/2008 | Hays et al. | 463/31 |
| 2008/0254896 A1* | 10/2008 | Sispoidis et al. | 463/43 |
| 2008/0275777 A1* | 11/2008 | Protheroe et al. | 705/14 |
| 2008/0288350 A1* | 11/2008 | Iris et al. | 705/14 |
| 2010/0023408 A1* | 1/2010 | McNeill | 705/14.69 |
| 2010/0100429 A1* | 4/2010 | McCloskey et al. | 705/14.12 |
| 2011/0225054 A1* | 9/2011 | Morris et al. | 705/14.73 |
| 2012/0136716 A1* | 5/2012 | Callaghan et al. | 705/14.46 |

FOREIGN PATENT DOCUMENTS

| | | |
|---|---|---|
| WO | WO 2005/086969 | 9/2005 |

OTHER PUBLICATIONS

Webite: www.racelinemotorworks.com/design.html, Copyright 2007 (printed Jun. 5 2009).

* cited by examiner

DYNAMIC REASSIGNMENT OF ADVERTISEMENT PLACEMENTS TO MAXIMIZE IMPRESSION COUNT

CROSS REFERENCE TO RELATED APPLICATION

The present application claims benefit to U.S. Patent Application Ser. No. 61/117,741, filed Nov. 25, 2008, which is hereby incorporated by reference in its entirety.

TECHNICAL FIELD OF THE INVENTION

The present invention relates to video games and in particular to a system and method for dynamically managing in-game advertisements in a manner that maximizes the number of impression counts for individual advertisements that are placed throughout the video game.

BACKGROUND OF THE INVENTION

One popular modern form of entertainment is a video game. A video game is generally a game that involves interaction with a user interface to generate visual feedback on a video device. The electronic systems that are used to play video games are known as platforms. Any number of different platforms exists for video games and in particular, one popular type is a video game console that interfaces with a display, such as an HDTV set. Alternatively, video games can be played on a handheld device or the games can be downloaded to a computer or a handheld device, such as a cellular phone, etc. Advances in technology have led to a dramatic increase in the number of video games and to dramatic advancements in the complexity and the quality of the graphics and sound effects and interactivity of these games.

A video game, like most other forms of media, may be categorized into genres based on many factors, such as, method of game play, types of goals, and more. Some of the more popular genres include sports related video games, such as baseball and football; educational; action, etc.

As the popularity of video games has proliferated, both video game designers and advertisers have realized that video games can be used as an effective means for advertising a product or service since, during play, the player's attention is focused on the screen which includes areas in which advertising banners or the like can be placed without impacting the play of the game.

More specifically, in-game advertising (IGA) refers to the use of computer and video games as a medium in which the deliver advertising. Each year revenues from in-game advertising increases and many in the game industry view in-game advertising as offering a viable revenue stream, allowing developers to offset growing development costs and to take more risks in proposing new game play to the gaming audience. The proliferation of video games has led to a reduction in television viewing in some demographic groups and therefore, advertisers are seeking to capture these demographic groups by expanding their medium.

There are different types of in-game advertising. In particular, static in-game advertising is one type of in-game advertising that has been popular, especially in early generation video games of years past. As the name implies, these advertisements are placed directly into the game by artists or programmers and can not be changed later. One type of static in-game advertisement is a virtual billboard, such as a billboard at a sports arena, while another type is an in-game product placement, such as a soft drink that the players drink after playing a sport, etc.

Another type of in-game advertising which is increasingly becoming the preferred means for in-game advertising is dynamic in-game advertising. Increasing Internet connectivity has led to the growth of dynamic in-game advertising and unlike the fixed advertisements found in static in-game ads, dynamic advertisements can be altered remotely by an advertising agency or an entity, such as the video game designer, that is managing the video game play, e.g., as when the video game is downloaded from a website, etc. Dynamic advertisements are downloaded for display in designated locations of the game, and which ads are actually downloaded can be adjusted to suit the geographical location or time of day, allowing for the delivery of time-critical advertising campaigns, such as those publicizing a movie launch or the launch of a new product, etc. Information can be sent back from the player's machine regarding advertisement performance; data such as time spent looking at advertisements, type of advertisement and viewing angle and this information can be used to better formulate future campaigns and also allows the advertising agency to offer more flexible advertising campaigns to their clients.

However, there are a number of deficiencies with existing in-game advertising. For example, in-game advertising is typically sold in blocks in that the advertisements for a particular game are populated for the whole game and most times, the advertisements are associated with one company. Thus, many times, the advertisements found throughout various screens of the game belong to one particular company (e.g., all in-game advertisements in a soccer video game may be from one soccer clothing or shoe manufacturer (e.g., Adidas®)). While the advertisements can be selected for a particular demographic, such as the Northeast states, by simply tracking where the downloaded game is being delivered and then, based on this information, delivering a selection of games for that region, the advertisements are merely loaded into for display at predefined times or at predefined locations as the player plays the game.

SUMMARY OF THE INVENTION

In accordance with one embodiment of the present invention, a method for dynamically reassigning in-game advertisements within a video game in order to maximize impression counts for the advertisements includes the steps of: determining when an advertisement at a first view location qualifies as on screen and incrementing an elapsed time for the advertisement while it qualifies as on screen. The method also includes the steps of calculating a current impression count for the advertisement and determining whether a maximum impression count for the advertisement has been reached or is within a prescribed value of being reached. If so, another advertisement is dynamically assigned to the first view location by removing the initial advertisement therefrom in order to maximize the cumulative impression counts for the advertisements.

The present invention is thus directed to an impression management engine that monitors the number of impressions for each asset, as well as manages the reassignment of the assets as discussed above in order to maximize the number of impression counts for the advertisements and allow more advertising revenue to be captured.

DETAILED DESCRIPTION OF CERTAIN EMBODIMENTS OF THE INVENTION

Figure 1:
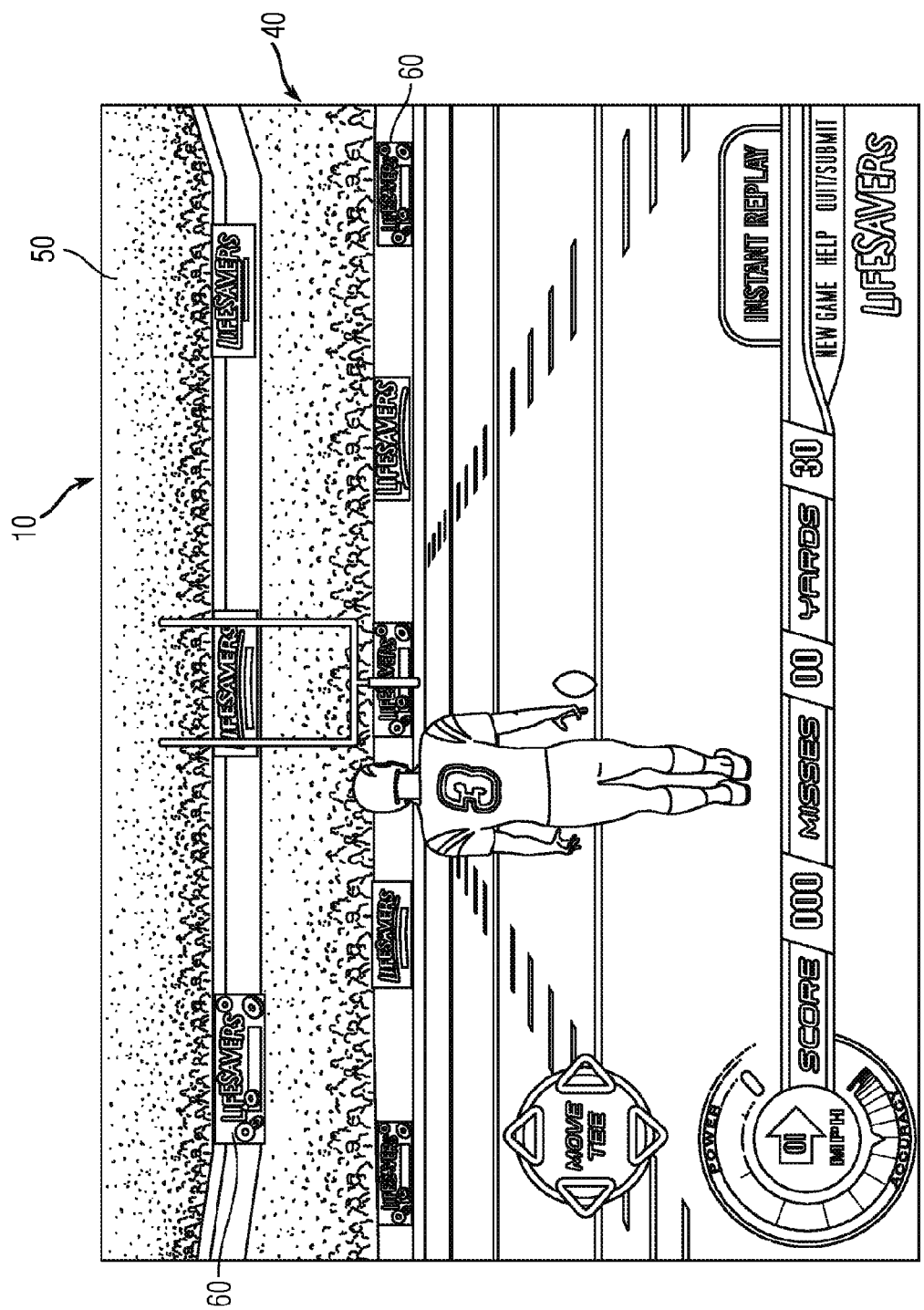
FIG. 1 is an exemplary screen shot of a football video game.

FIG. 1 is a screen shot 10 of one exemplary type of interactive video game, in this case, a football video game. The video game simulates actions that occur in the game of football and in particular, it simulates the act of field goal kicking. A kicker 20 is positioned and moves about a field 30 of play in order to line up and kick the ball toward the goal to score points. The game takes place in a simulated football arena 40 that includes stands that are full people 50. As in the real game of football, a vertical wall is formed around the outer periphery of the field 30 and serves to separate the people in the stands from the players. The vertical wall provides an excellent surface area for displaying advertisements, such as the banners 60 that are shown in FIG. 1. It will be appreciated that the video game shown in FIG. 1 is merely exemplary of one video game that is available and therefore a vast number of other video games are available in which in-game advertising is possible. Within the genre of sports, for example, similar surfaces are available for banner ads in the games of baseball, soccer, tennis, Nascar racing, and so on. It will also be appreciated that the banner 60 is merely one type of advertisement that can be used as an in-game advertisement and there are a number of other types of advertising mechanisms that are possible, including product placement within the presentation of the game, e.g., Nike® brand sneakers being worn by the players or logos of advertisers on clothing or sporting gear. Also, the advertisement can be found on the playing field itself, on the canvas of a boxing ring, on the road on which race cars drive, and so on. In sum, the advertisement can be found in a number of locations throughout the game screens. Also, a "splash" type advertisement can be provided between game levels, downs of a football game, after a free throw, etc. and comprises an advertisement that suddenly appears on the screen and then fades into the background or disappears.

Figure 2:
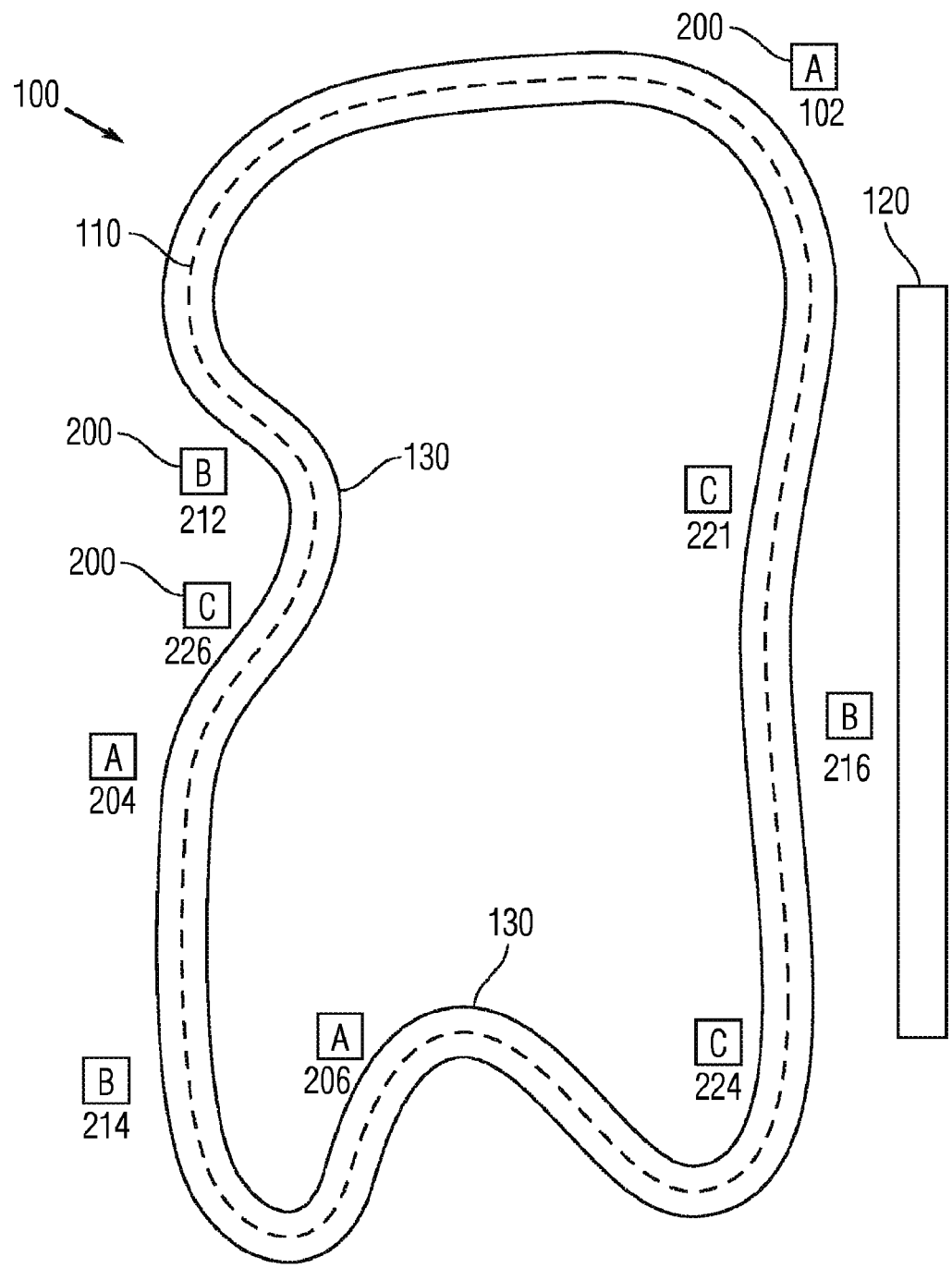
FIG. 2 is a top plan view of a race track layout and design, including areas for in-game advertising, for use in a racing genre video game.

One other common video game format is a racing video game, such as, an automobile-motorcycle-, or boat-racing video game. As in real life and as shown in FIG. 2, a race track 100 defines a course on which a vehicle (e.g., a formula one race car; a motorcycle, etc.) travels in order to complete laps. The track 100 includes a surface 110 (e.g., a paved surface) on which the vehicles travel and one or more grandstands 120 are typically provided at locations adjacent the track 100. In order to add complexity to the sport of racing, the track 100 can have an irregular shape such that a number of curves 130 are introduced along the track 100. The degree of curvature for a given track can vary and typically, as shown, the track 100 can include some minor (slight) curves, as well as, larger more dramatic curves. As the player drives the vehicle along the track 100, the driver is able to view the scenery that surrounds the track 100. For example, the player is able to view protective walls that are placed along the perimeter of the track 100, the grandstand(s) 120 and any other scenery, such as trees, that can line the track 100. Typically the track changes in tandem with changes in game levels or difficulty settings.

In addition, a plurality of uniquely identifiable advertisements locations can be provided along the track 100. As the player drives along the track 100, the player passes the advertisement locations and thus, when advertisements are displayed in these locations, the player can have an opportunity to view the advertisements during game play depending upon different parameters related to game play. The advertiser accepts the display of the ad as an impression on the player in view of other parameters that are coordinated with game play, such as the exact location of the advertisement on the screen during game play, its prominence on the screen (i.e., is it rendered as an object far in the distance such that the pixels allocated to the advertisement are below a threshold number), as well as how long the advertisement with suitable prominence is displayed on the screen. For example, in the game of soccer, the player may maneuver his or her controlled player in such a way that a particular advertisement billboard along the side of the stadium is only partially visible (i.e., only partially on the screen) and therefore, the entire advertisement is not clearly visible on the screen.

As shown in FIG. 2, in-game advertisements 200 can be located throughout various screens that appear during play of the video game and in the case of the race track 100, the advertisements 200 are identified as blocks that are labeled with a capital letter. As can be seen, many times a game includes multiple sources of advertisements (e.g., multiple advertisers or multiple advertisements) and for simplicity, the label "A" indicates a single advertisement that originates from one source (e.g., a first company); "B" indicates a single advertisement that originates from another source (e.g., a second company or a second ad from the first company); and "C" indicates a single advertisement that originates from yet another source (e.g., a third company or another ad from either the first or second companies). Of course, the video game can include advertisements themselves can be provided by one source or more than one source.

Figure 3:
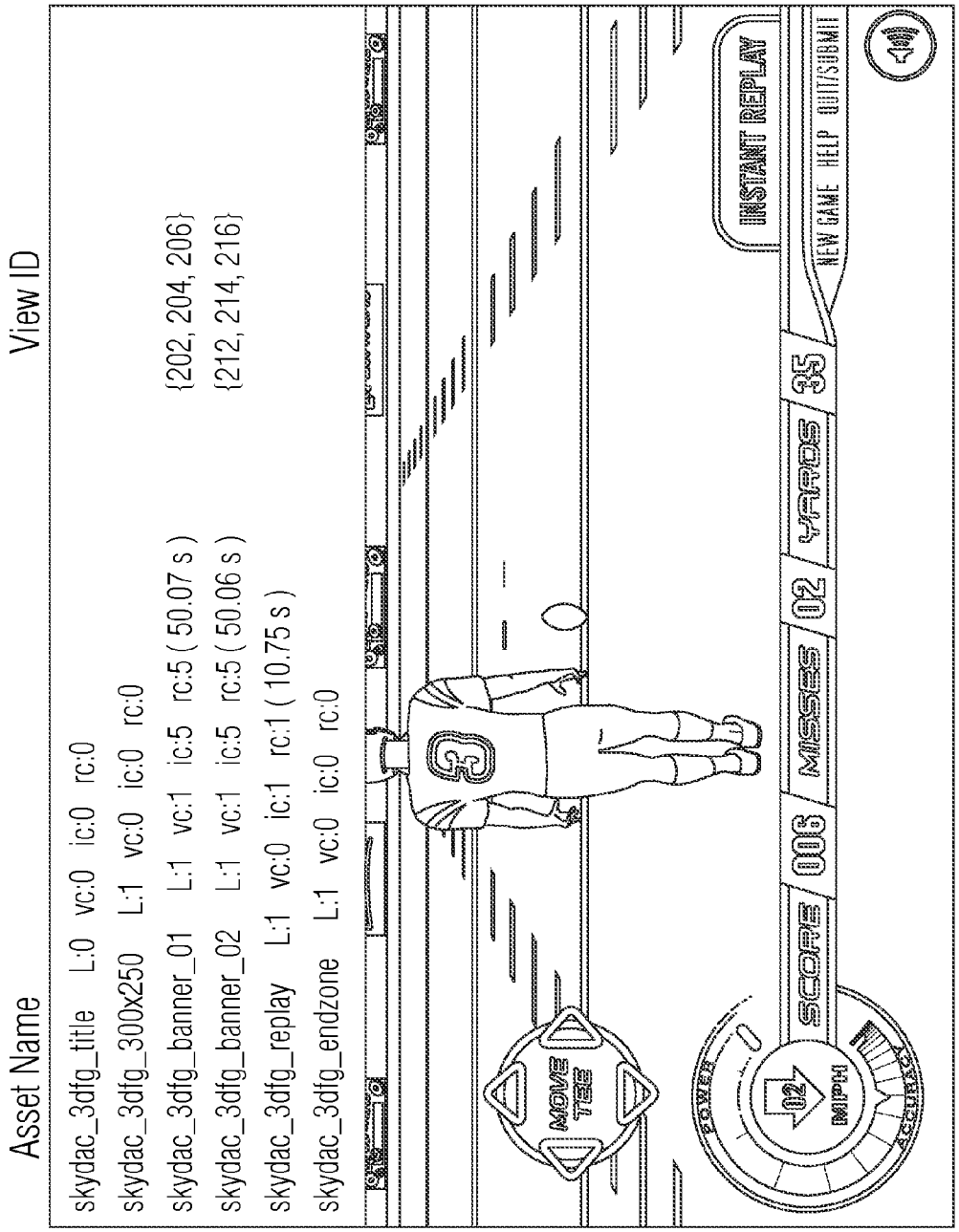
FIG. 3 is a partial screen shot of a football video game along with a table of corresponding assets and associated view count and impression count information.

In accordance with one exemplary embodiment of the present invention, a system and method for dynamic reassignment of advertisement placements maximize an impression count of the in-game advertisements. For the purpose of the present specification and as described in connection with FIGS. 2-5, there are several different terms that can uniquely identify each in-game advertisement that appears in the video game. More specifically, each in-game advertisement can be identified by the code executing the surrounding game by an asset name which is the variable used by the computer to identify the advertisement. There are a finite number of locations in the game that can display an advertisement, including some locations that are reserved for the title page and other locations that are reserved for a splash screen. The title page appears upon loading the game and so any ad associated with that location is only displayed at game commencement whereas the splash screen can appear multiple times during a single game, such as between field goal attempts or between innings (baseball) or sets (tennis), after a first down (football), after a period (basketball or hockey), etc. In FIG. 3, there are six asset names used to identify the ads that are downloaded into the game for use during game play. The asset names are used by the video game to pull and display a particular advertisement ("creative") that has been downloaded for use in the game. Each of the assets has been denoted "Skydac_3Dfg" and is further denoted to identify its purpose in the game (title screen, a 300×250 size banner, and various banners, replay, and endzone images).

It will be appreciated that when the advertisement is discussed as being a "creative," this refers to the image of the advertisement itself and is different than the asset name since the asset names are the variables assigned to the creatives when the creatives are downloaded to the video game and are used by the code to place the creatives throughout the video game screens.

Assets can also be grouped together so that all views of one particular company's advertisement are aggregated into a single group and their placement and view and impression count information can be monitored and managed. In FIG. 2, all the "A" type creatives (advertisements) can be aggregated together in order to count toward a total impression. For example, a creative A (e.g., for a particular soft drink) is visible on the screen, regardless of whether it is in locations 1, 2 or 3, its time on the screen is counted for so long as it is displayed in accordance with the rules that govern when an in-game advertisement is sufficiently visible to be counted toward an impression count. Thus, if it is suitably large and not markedly cut off and not presented with skew beyond a set amount, then the time on the screen is counted.

As noted, each advertisement that is downloaded for placement into the video game is associated with an asset name. In addition, the unique locations in the game at which the various ads are to be displayed preferably have a view identification or other identifier associated with their locations. In this way, each view location can be associated with a different asset name. Thus, for example, if the same advertisement (i.e., an advertisement identified by the same asset name, such as "skydac_3dfg_banner_01") is to be displayed in multiple different locations throughout the video game, then each uniquely identified location (202, 204, 206) provides a different view for the same asset. In the racing game of FIG. 2, each box identified with an "A" reference the same asset at different locations throughout the video game. For example, the view locations 202, 204 and 216 are all associated with a common asset (as illustrated, "A" which could be "skydac_3dfg_banner_01" as in the 3D football example, or any other advertisement or creative), though any one of these locations can be readily associated with a different advertisement or creative, as discussed below. Software code is used to assign ad-locations to the asset names. Thus, in FIG. 2, the ad-location assignment function has assigned ads as follows:

| 202(A) | 212(B) | 222(C) |
| --- | --- | --- |
| 204(A) | 204(B) | 204(C) |
| 206(A) | 206(B) | 206(C) |

In the case of the racing video game of FIG. 2, location 202 with advertisement A is placed at the end of a straight away, while location 206 with advertisement A is located in the middle of a sharp turn. A player generally does not each location for the same amount of time, and this is true for the race track example of FIG. 2 as well as for other game types in which the player influences what is shown on the screen at any given time.

For purposes of illustration, the table in FIG. 3 can have a column that is labeled "View ID" and this serves to identify the exemplary locations assigned to the downloaded advertisements shown in FIG. 2. It will be appreciated that the view ID field can be a linear array or a set of locations varying from zero to an arbitrary integer number. In FIG. 2, each of the assets is assigned three locations and so the view ID for each of three of the ads in FIG. 3 is associated with an array of three locations. In particular, FIG. 3 has the asset name skydac_3dfg_banner_01 assigned to locations 202, 204, and 206. This is the same as creative "A" in FIG. 2, where "A" is shorthand for "skydac_3dfg_banner_01;" the asset name skydac_3dfg_banner_02 is assigned to locations 212, 214, and 216. This is the same as creative "B" in FIG. 2, where "B" is shorthand for "skydac_3dfg_banner_02;" and another asset name (not shown) is assigned to locations 222, 224, and 226 (creative "C" in FIG. 2), though these locations can be assigned to creatives "A" or "B" if there are fewer ads to show. Essentially, the view ID is an array of variables with each variable being assigned an asset name. For ease of reference, we refer to a specific view ID as 202(X), where "202" is the location in the video game that has space reserved for an ad and "X" denotes the ad that has been assigned by the ad-assignment function. It should be understood that a default value for "X" ensures that the rendered game is complete even if there is an interruption, disruption, or prevention of a set of ads being downloaded and assigned to the various view locations in the game.

Preferably, information is gathered during game play that tracks the amount of time that each specific location is viewed. However, for ads that have impression counts gauged on total view time, the locations in each view ID set can have their time aggregated for purposes of determining when there has been an impression count and for reporting purposes.

As discussed below, the creative can come in any number of different formats (e.g., jpeg, animated jpeg, flash) and can be downloaded from the same server that sourced the game to the user or from an ad server that has been informed of the user's game download request. Once downloaded, it is assigned a location and rendered at that location. Depending on the format of the ad, it can be rendered by a suitable rendering engine within the game software.

With further reference to FIG. 3, the table maintains additional information of pertinence to the present invention. Preferably, the table is a simple table structure stored in memory of the host machine or in a data cache of the executing game. For each asset name, the software maintains a flag identifying whether the creative has been properly loaded. For instance, this can be indicated using a binary data element with "1" indicating that the creative has properly loaded and "0" indicating that the creative has not properly loaded. Whether a creative has been properly loaded can be determined in the same manner that any small file download is tested for correctness. By way of example and not limitation, the test can look to a checksum in the downloaded file and compare to the file size that was downloaded. In the example of FIG. 3, all creatives have been loaded except for the first one that relates to the asset that is placed on the title screen. It may be that there were no title screen sponsors willing to pay to have an ad placed. Thus, during execution of the game, the L:0 value preferably will have the game render a default object in the location that the downloadable ad would have gone.

The game software preferably also maintain a "view count" value (abbreviated as "ye") to indicate the number of instances of a particular asset that is on the player's screen at any given time. For example, an end zone view in the video game of FIG. 1 may include the same asset in opposite corners of the end zone and in this case the view count would be two (vc:2). Generally, the view count is expected to be one, and so this is an optional feature. However, in certain games, such as shown in FIG. 1, the same creative can appear in more than one location with a suitable size and viewing perspective so as to warrant its being counted as a view. The effect of the view count it can cause a timer to run at a multiple of its normal speed when counting the time that an ad is on a screen. Equivalently, the VC value can be used to multiply the total time counted. This is discussed below in connection with step 560 of FIG. 5.

The purpose of the view count parameter is to trigger a timer to run. Specifically, whenever the view count is non-zero a timer runs to keep track of the total time that a given asset is on the screen. The total time count for a given asset can take into account the time that has elapsed for each view location of the same asset. That is, if the view ID indicates that locations 202, 204 and 206 all have the same asset name associated with those locations, then whenever any of those locations is on the screen (or more than one is on-screen), the view count will be non-zero for that particular asset, and the timer will run. A rule base determines the count value required to realize an impression count, which is the minimum on-screen time required to satisfy an advertiser that they should pay for the impression on the mind of the player. In other words, until a prescribed time period (say, 5 or 10 seconds) is reached, the view is "fleeting" and does not qualify as an impression. On the other hand, once the rule has been satisfied, then the impression count is incremented. In FIG. 3, impression counts have reached the value 5 (five counts) for each of banners 01 and 02 whereas the impression count for the "replay" asset is at value 1. As game play proceeds, impression counts increase with view time of each asset, and at intervals or sporadically, the impression counts are reported to a server for various purposes including billing and game metrics analysis. The reported counts are maintained under variable "RC." The software is written to report impression counts whenever practicable, and preferably so as to not slow game performance. In this regard, the reporting function can comprise a message sent by the game over the connection to the server that sourced the game (so as to not raise any security concerns) at times when the player is changing levels, has just lost a player, or that the game is not in a data-intensive moment of play. The goal is to have the reported count equal the impression count so that each impression is, in fact, reported.

Figure 4:
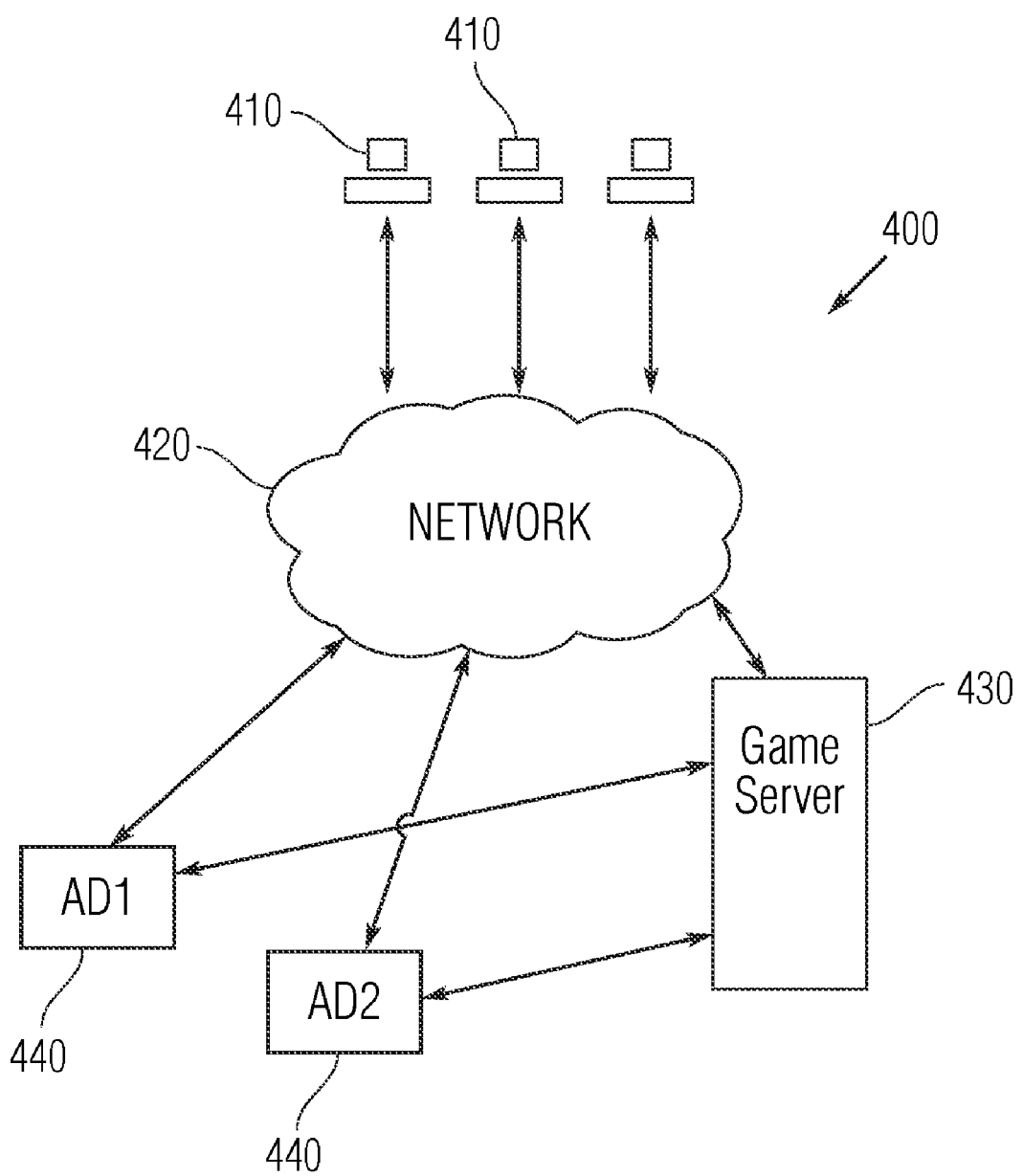
FIG. 4 is a block diagram illustrating the network architecture of components of one exemplary system according to the present invention.

FIG. 4 is a block diagram of a network architecture of components of one exemplary system 400 according to the present invention. More specifically, the system 400 includes at least one client 410 which in the case of a video game is defined by one or more players of the video game. The client 410 can thus be in the form of an interactive device on which the video game is displayed. The client 410 can be a stationary device, such as a personal computer or video game console, or it can be a handheld unit, such as a cellular phone, a PDA, a laptop or netbook computer, a portable video game player, etc. Each client 410 is connected to a network 420, such as the Internet, which permits communication between the clients 410 and a game server 430. As is known, the game server 430 provides a selection of games including multiplayer games to the game clients 410. Most video games played over the Internet operate via a connection to the game server 430. The game server 430 has a memory and database in which a number of different games are stored for selection and play by client 410. For example, the game server 430 includes video games that can be downloaded to the client (player) 410. The video games are typically organized by genres or some other manner of easily classifying the video games to allow a player to easily search and select a game for play.

The system 400 also includes at least one advertisement server 440 that is in bidirectional communication with the game server 430, and optionally with the network 420. The advertisement server or ad server 440 is a computer server, specifically a web server that stores advertisements that can be included in the video game as an in-game advertisement. The ad server 440 thus serves to upload advertisements from various businesses and the like that desire for their advertisements to be viewed by potential customers, in this case, players of the video game. The advertisements stored on the ad server 440 can take any number of different forms, including banners (static images/animations) or text and can be stored in any number of different formats, including jpeg, etc.

In the system 400 of FIG. 4, there are two ad servers 40 shown; however, it will be appreciated that the system 400 can include only a single ad server 440 that is in communication with the game server 430 or it can include more than two ad servers 440. For example, the embodiment of FIG. 4 shows a first ad server 440 and a second ad server 440, each of which is in bi-directional communication with the game server 430. Each ad server can have an open reporting format or a proprietary format. Optionally, video games constructed in accordance with the present invention include a communication module comprising code that is configured to report impressions in a format that is compatible with the ad server's interface. Alternatively, an interpreter can be disposed at the game server 430 and be configured to receive reported counts from the deployed games and to relay that information to the ad server that provided the ad for use in each such game deployment.

When a client requests that a game be downloaded, the ad server is polled to provide a set of ads that satisfy each of the asset names that are available for the selected game, if possible. As noted, if there is no ad to download, a default image can be rendered in the game. On the other hand, the ad server 440 is preferably informed by the game server 430 of the identity of the game that is to be downloaded and of any constraints or requirements for the ads (e.g., ads must satisfy an Entertainment Software Rating Board (ESRB) rating requirement, or must not be in a particular category or relate to a particular topic (adult theme, alcohol, etc.)). The game server 430 communicates with the ad server 440 to download suitable advertisements that have been selected for placement in at least the video game that is to be downloaded. It should be understood that the ad server can serve ads to the game server 430 in anticipation of a game download so that the ads are available for rapid download to the client machine 410. The selection of which advertisements to place in which video game is performed can be made by the ad server, in which case the selection forms no part of the present invention. Alternatively, the selection can comprise a targeting and optimization protocol implemented by the game server 430 in order to optimize bid prices, placement, targeting or other characteristics to generally maximize the value of the ads to the target audience and the revenue to the game supplier. This can include contextual targeting where optimal ad placement is inferred from information contained on the page where the ad is being served. For example, in a race car game, tire company ads, beer ads and car company ads are could be selected more often other ads based on contextual targeting. If use profile information is known, then that can be used to refine the targeting and optimization process.

By having dynamic ad placement, the video game server 430 can continuously or selectively interact with the ad server 440 and upload select advertisements, as needed, for placement in a video game that is being uploaded to one or more clients 410.

Figure 5:
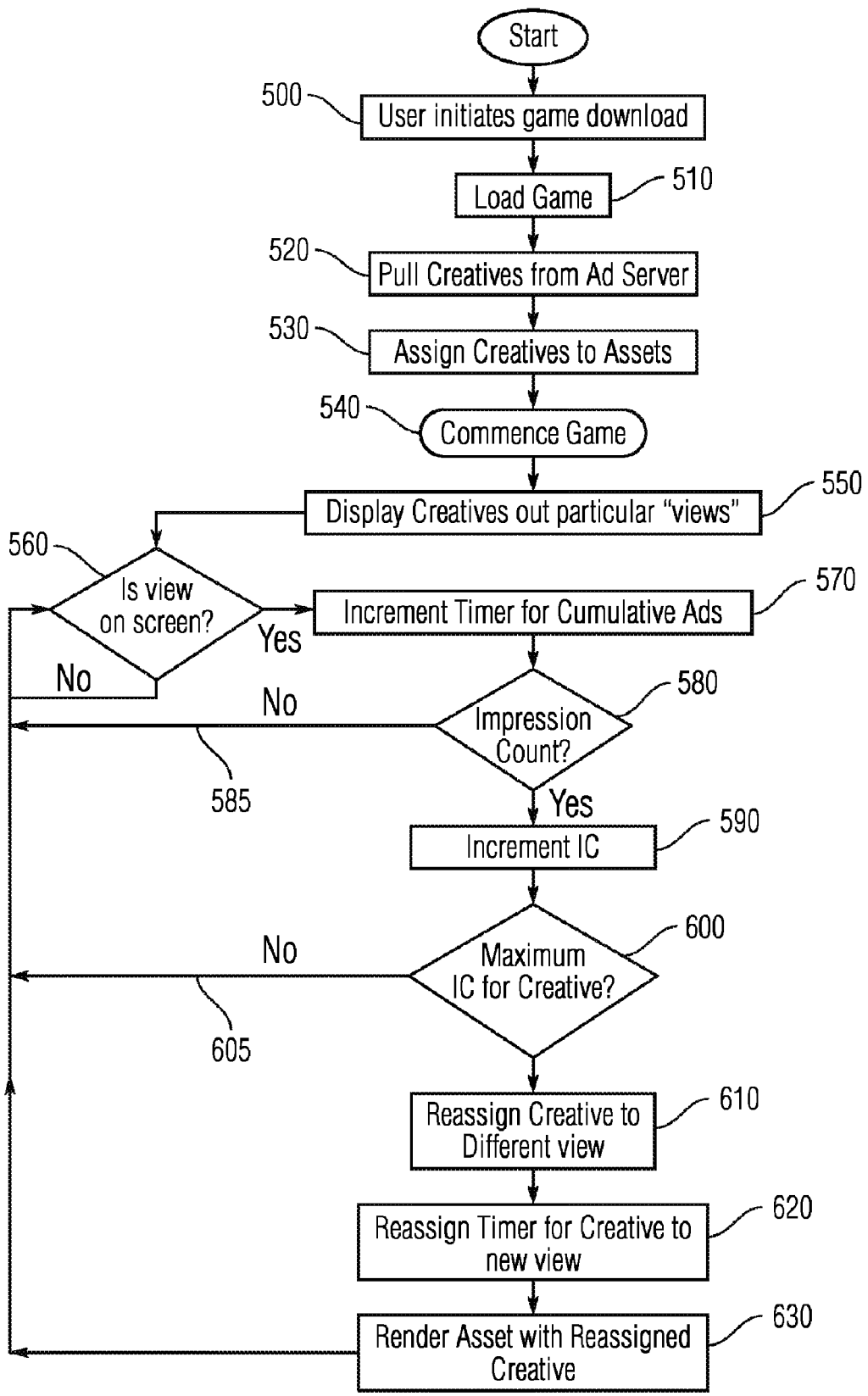
FIG. 5 is a flow chart illustrating exemplary architecture and functionality of an in-game advertising management system where impressions are managed through dynamic re-assignment of creative placements.

FIG. 5 is a flow chart of a process for dynamically reassigning in-game advertisements placements in order to maximize an impression count in accordance with a salient aspect of the present invention. While the process is outlined as a series of steps, it should be understood that this is an expedient to discuss the various actions that take place, whereas in a practical implementation the tests and actions can be initiated and managed by objects in response to events that occur during game play.

In a first step 500, a client 410 initiates a video game download from the video game server 430. As discussed above, the video game server 430 includes a number of different video games that can be selected for play by the client 410. At step 510, the selected video game is downloaded to the client 410 (e.g., to a video game console or a handheld device, etc.). Each video game is configured so that, on selected screens, in-game advertising can be placed in lieu of default images that otherwise would be rendered at prescribed locations within the video game. As the player plays the game, the client 410 maintains bidirectional communication with the video game server 430 at least to support impression count reporting, as noted above, and optionally to allow downloads of further portions of a video game (for larger games) as well as further in-game advertisements.

At step 520, creatives (advertisement files) from the ad server 440 are pulled and delivered to the client 410. The creatives can be downloaded from the ad server 440 directly to the client as the video game is loaded in order to stream line and optimize the downloading process to the client and allow the client to play the video game with a minimum amount of downloading as the game is played. In many implementations, however, the ads will be served by the same machine that sources the video game, whether it is the game server 430 or the ad server 440. The ad server provides the correct number of creatives to populate the locations of a given video game. There can be communication between the game server, the client, or both on the one hand and the ad server on the other hand to identify core metrics for the ad serving function, such as the genre of the game, any constraints, any metadata to add context for ad targeting and optimization, any user profile information, and the like.

Optionally, the game server 430 can build a profile for this client 410 and build a history for this particular client 410. For example, the game server 430 can determine which video games have been downloaded by the client 410 and which ads have been already downloaded to any given client along with a viewing summary for each creative (e.g., which creatives were viewed and for how long).

At step 530, the creatives are assigned an asset name. In other words, each creative (advertisement) is uniquely identified by an asset name as described above. Once downloaded, the individual creatives are accessed using the variable names to which they have been assigned so that they can be rendered at their assigned locations (corresponding to the view ID assignments). At this point, each creative for placement in the video game is uniquely identified with a logical name that can be used by the computer for placing the creatives in the video game and for managing the location of all creatives. Each asset is assigned a particular location or view on a screen of the video game using the ad-assignment function described above, so that it is viewable during game play as a function of the actions of the player.

At step 540, the game is commenced by the player and typically, the game begins with a title page being first displayed and then there may be an interactive page where the player makes certain game selections, such as number of players, game difficulty, etc.

At step 550, the creatives are displayed at particular views throughout the video game as it is being played by the client 410. Each view is a location within the game, such as locations 202-226 in FIG. 2, and is uniquely identified by the software. Among the downloaded creatives, there are some that are tagged as being for the title page or for a replay screen, or for certain purposes (player advances a level and hears a sound file, e.g., a .wav file). There are also creatives that are provided for display within the game, during game play. These ads are assigned one of the locations and game play commences. For example and with reference to FIG. 1, in a sports video game, such as football or soccer, advertisement banners can be placed along the stadium and/or on or near the playing field. Any one that has recently attended a sport event knows that a considerable number of advertisements are placed around the stadium. The more visible the location, the higher the cost for advertising at that location compared to others. It will be understood that in-game advertising can be placed in any number of different locations including at locations that may be on a player's clothing or may be placed on a surface of an item, such as a ball or racquet.

In one example and as previously mentioned, in a race car video game, advertisements can be placed at various locations along the race track. FIG. 2 shows exemplary in-game advertisements views along the race track. It will be appreciated that individual views will only come into view and be visible when the player is positioned relative to the in-game advertisement so that it can be viewed on the screen. Of course, the level of detail that is visible and the length of time that the view is visible on the screen depends on a number of factors, including actions of the player (e.g., how fast the race car is going, how the race care is steered, etc.). A view location that may be viewed many times by one player due to that player's skill and play characteristics may differ greatly from that of another player. For instance, the other player may favor corner kicks in the game of soccer and thus creatives located in the stadium's corners are more visible to that player than the first player who wants to move up the field toward the goal.

At step 560, it is determined whether any assets are present (visible or identifiable) on the video game screen. Certain programmed rules preferably govern the determination as to when an asset qualifies for a view count in view of its being viewable on a screen. Various rules can be included in the game software to make this determination, and the rules can be guided by parameters supplied by particular ad servers, advertisers, or both. Similarly, rules can gauge spatial and temporal aspects of the asset's appearance on the screen in the determination as to whether the appearance qualifies as a view count so as to have a timer incremented toward an impression count—the ultimate goal. For example, one rule may be that at least 50% of the area of the asset must be present on the screen in order for the asset to be counted as being viewed. Another rule can be that the resolution of the asset must reach a threshold or the number of pixels that have been allocated to view the ad given the player's current perspective of the game environment must reach a threshold so that the advertiser can be assured that the asset can be sufficiently discerned by the player by the time that the view is counted and the timer runs toward establishing one or more impression counts.

If no assets appear on the screen, then the process loops back to step 560. Generally, game play continues and the process of FIG. 5 operates as a background thread to manage the in-game ad presentation. This thread is of vital importance because the ad revenue from impression counts can support a discounted or free distribution of the video game. Likewise, the code utilized I the process of FIG. 5 must be optimized so as to minimize impact on game play. In other words, the process is preferably computationally light and efficient.

On the other hand, if the asset appears on the screen, then at step 570 an increment timer is started at the client's machine. The increment time is designed to keep track of the length of time that the asset is viewed on the screen. Once again, rules governing whether the asset is "viewed" on the screen are observed during operation of the increment time in that once the asset is not "viewed" on the screen, the increment timer is stopped and the time is recorded and saved.

As understood in the art, the locations can be ad-container objects that can be associated with particular assets. Such objects can have methods that manage and operate upon each respective object. One method can determine when a view count is valid for the object and to start and stop the timer. When the view ID array includes plural objects, a different object can associate those objects with the same asset name together. For example, a parent object can receive the individual timer values from the objects in the view ID array and aggregate their values to arrive at impression count numbers and to initiate further methods for reporting the impression count.

At step 580, it is determined whether an impression count has been reached. An impression count is reached when an advertisement has been viewed by the player for a predetermined amount of time. Before that amount of time is reached, the appearance of the creative on the screen is insufficient to qualify as an advertisement presented to the player. The predetermined amount of time can be coded into the video game or be metadata associated with the creative served by the ad server 440. The software optionally includes logic that supplants a default setting with a lower threshold that accompanies the served ad. The software optionally can mandate an upper limit on the threshold so that a value that is higher than the game's threshold value (e.g., 20 seconds) is ignored.

It will be appreciated that values in the increment timer are stored at the client 410, possibly in connection with an object that contains the ad itself. When the same creative is subsequently displayed in a different part of the game, the increment timer can begin counting again from its prior value, or any additional time can be aggregated by code executing within the game. Regardless of how it is implemented, the point is that the client 410 tabulates which assets have been viewed and for how long (cumulative time).

Also as previously mentioned, the increment timer values of multiple viewings of the same advertisement (same asset located at different views in the video game) are aggregated for the purpose of comparing the increment timer value to an impression count value. For example, discrete views of the same ad are aggregated to arrive at a total time. Thus, if the same creative appears in two locations and has been qualified as a view count so as to have timers run at both locations then the values of those timers can be aggregated. Hence, a 4 second timer count at location 212 and 6.07 second count on a timer at locations 214 can be aggregated because both concern asset "B," for a total count of 10.07 seconds. If the prevailing rule is that an impression count is to be registered when an asset is viewed for 10 seconds, then the combined viewing of the same asset at the two view locations counts as an impression count (IC:1). In addition, if the view count is more than 1 for a particular asset meaning that more than 1 asset is viewed on the screen at the same time, then the increment timer will run at VCx the speed, where "VC" is the view count value (that is, the number of copies of the asset that are on the screen at the same time). For example, if the same asset appears two times on one screen, then the increment counter will run at a 2× speed.

If an impression count has been realized due to an asset being viewed on screen a sufficient amount of time to satisfy the impression-count requirement, then at step 590 the impression count is incremented or calculated at the client's machine 410.

Impression counts, however, do not continue to benefit the advertiser after a certain level; the philosophy is that the player has had a sufficient impression that further impressions no longer have the same value. Many times, advertisers have an agreement with the ad server company that the advertiser will only pay for a maximum number of impression counts for each particular creative (advertisement) that is placed in the video game for a given play of the video game or for a particular client download. For example, a company may only be willing to pay for five impression counts for one creative (advertisement) for a single play of the video game. The number of impression counts that are realized in a particular game play depends upon a number of factors, including the type of game (e.g., a game, such as football, with set defined play periods), the skill level of the player, the number of players, etc. For example, a skilled player may be able to navigate through a considerable number of screens and thereby, one creative may be viewed by the player a number of times that far exceeds the maximum number for which the advertiser is willing to pay.

Alternatively, a player that is very slow in his or her game playing may result in an asset being on screen for a significant amount of time. For example, a slow player may position his or herself on the playing field in view of a banner advertisement (a creative) that stays on the screen for a considerable amount of time. In this situation, the maximum impression count for a particular asset may be reached very quickly at the onset of the video game. Since the advertiser has only agreed to pay for a predetermined number of impression counts, once this impression count limit is reached or is close to being reached, the video game provider does not realize any added benefit in maintaining this same advertisement on screen as the player continues play of the video game. Similarly, the advertiser does not realize continued value that it would be willing to keep paying for once the maximum number of impressions has been met. In known games that have ads, the advertiser does not have an incremental cost to having the ads displayed continuously and enjoys that benefit, but maintaining the same asset on-screen converts, effectively, to free advertising for the advertiser since it does not generate any additional revenue to the game provider due to realized impression counts and since it does not have any additional cost to the advertiser. This does not benefit the video game provider and the system and process of the present invention is constructed to address this issue and the loss revenue that accompanies it.

In the example of FIG. 2, the asset that is located at view 202 may have high visibility due to its location along a straight away of the race track 100 and therefore generates many views; however, views 204 and 206 may not generate many views that count towards the aggregate value of the increment timer due to their locations near sharp turns along the track. As a result, the aggregate impression count for the creative (A) is hurt by the lower visibility of the views 204 and 206. Conversely, views 222, 224, and 226 may generate more views and result in the increment timer reaching or approaching a maximum increment count for the creative, in this case creative (C).

Impression counts can be determined and managed in any number of different manners. For example and according to one embodiment, the new, updated impression count ($IC_{new}$) is equal to the elapsed time that the asset has been viewed on the screen divided by the impression count threshold value. The integer component of this value represents the $IC_{new}$. The elapsed time can be a running cumulative total which is then divided by the IC threshold value to calculate a current new impression count. For example, if the elapsed time is 43.2 seconds and the IC threshold is 10 seconds, the $IC_{new}$ is 4.32 and since the new value is the integer component, the result is IC=4. If the same asset appears on another screen for 8 seconds, then the elapsed time is 51.2 seconds and the $IC_{new}$ is 5.12 (integer, $IC_{new}$ is 5). Alternatively, the increment timer can reset each time the timer reaches the threshold and the comparison is thus between the reset increment timer value and the threshold value. For example, if the threshold value is 10 seconds, every time the current elapsed time value reaches 10 seconds, the timer resets to zero. Other mechanisms can be employed for keeping track of the total impression count for each asset without departing from the broad teachings in this disclosure.

In accordance with the present invention, at step 600, a comparison is made at the client's machine, by the game software implementing the present invention, to determine whether a maximum impression count has been reached or if the maximum impression count is being approached. The rule for determining whether the current impression count of the asset is approaching is preferably established by the game provider independent of the ad server and any ad that may be served. In establishing the parameters, the game developer can consider the action of the game so that a location that is counting more time than other locations can be identified as a location that is more apt to approach a maximum than some other location, and its "approaching" threshold can be set accordingly.

If the maximum impression count is five (5) for a particular creative and the current impression count is four (4), then under some circumstances, this may be defined as "approaching" the maximum impression count. "Approaching" the maximum impression count can also be defined as a threshold percentage compared to the value of the maximum impression count. For example, if the maximum impression count value is 10, the current impression count can be defined as approaching the maximum when the current impression count value is at least 70% of the maximum impression count value. In other words, as soon as there as 7 impression counts in this example, a signal can be sent alerting the client's machine that the maximum impression count value is being approached.

As set forth in FIG. 5 and in accordance with a salient aspect of the present invention, if the maximum impression count has been reached or has been approached by a particular location 202-226, then at step 610, the creative assigned to that location is reassigned to a different location. In the example of FIG. 2, the creative C may reach or approach its maximum impression count before the other creatives A and B and therefore, at step 610, the creative C is replaced with another creative. In one embodiment, creative C is switched with creative A or B in accordance with an algorithm that strives to maximize impression counts for all of the creatives and not have one or two creatives at a low impression-count value while others have reached or are approaching their respective maximums.

The rules for governing the reassignment of the creative at step 610 are programmable and can vary from one application to another. For example, the reassignment can be as simple as switching the creative that has reached or is approaching its maximum impression count with the creative that has the lowest relative impression count. Alternatively, other rules for reassigning creatives can be followed (e.g., the reassigning step involves reassigning more than two creatives).

It will also be appreciated that while in one embodiment, the creatives that are initially downloaded to the client 410 remain the only creatives that are placed in the video game even after one or more reassignment steps are performed. In other words, the ad server 440 or game server 430 downloads one set of creatives to the client 410 and no additional creatives are downloaded to the client 410 during game play. The creatives that are reassigned are limited to the original set of downloaded creatives. Alternatively, the ad server 440 or game server 430 can download additional creatives to the client 410 during select times during play of the video game at the client 410. Any constraint on the number of ads downloaded is typically a result of a business rule that dictates how much load is tolerable to a user beyond the required download of the game itself. If the user has exceptional bandwidth or superior connectivity, then that user might tolerate more ad downloads than a user with a sub-optimal connection to the game server and/or ad server.

For example, the download of additional ads should not impact the game play in that the user should not perceive that any delay in game play is because additional ads are being downloaded from the ad server 440 to the client 410. In other words, there should be no observable decrease in game speed due to the download of additional ads to the user. New ads could thus be downloaded in between levels of the video game and therefore, the player would only believe that a new level is being loaded as opposed to understanding that new creatives (advertisements) were being downloaded to the client 410. In this embodiment, the reassignment of creatives can involve removing from the video game a creative that has reached its maximum impression count and replacing it with or placing another new creative in a view found in the video game. Replacement can be by executing the ad-assignment function described to above.

It will be appreciated that it may be desirable in many instances to reassign the assets prior to one creative reaching its maximum impression count since a reassignment of at least two different creatives may result in both reassigned creatives reaching their maximum impression counts, thereby maximizing the revenue that is collected from the advertisers as opposed to only one creative reaching it maximum quickly and other creatives not reaching their maximum due to any number of different reasons including the view locations of these other creatives, the style of play by this particular client, etc. This is why step 580 involves not only determining whether the maximum impression count has been reached for one asset but also determining whether the maximum impression count is being approached as defined by the ad server 400.

If the maximum impression count for the creative has neither been reached nor has it approached the maximum impression count as defined by the ad server, then at step 605, the process loops back to step 560 and a determination is made whether the view remains on the screen.

In addition to reassigning the creative to a different view at step 610, the increment timer for the creative is likewise reassigned to the new view that the creative has been reassigned to a different view. This ensures that both the creative and its associated increment timer (along with its stored value) are reassigned to the new view and thus when the reassigned creative is viewed at the new view location, the associated increment timer begins counting again where it the timer previously left off. As will be appreciated, much of this can be managed in an object-oriented programming environment by changing the values associated with the objects.

At step 620, the asset with reassigned creative is rendered (placed) at the new view location in the video game. After rendering the asset at the new view (location), the process loops back to step 560 where it is determined if one or more assets are in view on the video game screen of the player. From step 560, the process of the present invention is repeated in that steps 560-630 are repeated in order to accurately initiate and track the increment timer for each creative.

In addition, the system and process of the present invention are configured so that the number and details of the creative reassignments are stored and this information can guide and influence future reassignments. For example, if at step 610, creative A is reassigned to a different view resulting in creatives A and C switching view locations throughout the video game screens, then if subsequently, it is determined that creative B has reached or is approaching its maximum impression count, the present system keeps track of the impression count totals of each creative and is aware of which creatives have been reassigned. Accordingly, the present system calculates and reassigns those creatives in a manner that optimizes the impression count values for a maximum number of creatives.

Preferably, a replacement routine operates in the game software to control the moment that ads are replaced. Because a video game has an environment that sometimes emulates the life, the replacement routine can better ensure that ads are switched to new locations when they are presently not viewable on the screen. In other words, the replacement routine can manage the timing of the replacement once a determination has been made that a given asset is to be relocated. The replacement routine can delay the change in asset locations until the VC=0.

As previously mentioned, the conventional method of in-game advertising is that a sales team sells the whole game/ whole experience. In contrast, the present invention is configured to count impression counts for each asset and advertisers pay only based on impression counts. The system of the present invention can also incorporate the concept of a "cast" in that a uniform resource locator (URL) can be used for retrieving advertisements from the game server 430 or directly from the ad server 440 to get advertisements that are to be included in the cast. This can be done when the video game loads and when we report the maximum number of impressions.

The present invention is thus directed to an impression management engine that monitors the number of impressions for each asset, as well as manages the reassignment of the assets as discussed above in order to maximize the number of impression counts for the advertisements and allow more advertising revenue to be captured.

While the invention has been described in connection with certain embodiments thereof, the invention is capable of being practiced in other forms and using other materials and structures. Accordingly, the invention is defined by the recitations in the claims appended hereto and equivalents thereof.

What is claimed is:

1. A method for dynamically reassigning in-game advertisements, the method comprising:
   determining when a first advertisement at a first view location qualifies as on screen;
   incrementing an elapsed time for the first advertisement while it qualifies as on screen;
   calculating a number of impression counts for the first advertisement, the number of impression counts comprising the elapsed time for the first advertisement divided by an impression count threshold value, the impression count threshold value reflecting an amount of time during which the first advertisement is viewable within a video game that qualifies as an impression of the first advertisement;
   identifying the first view location as a location that is more apt than one or more other view locations to approach a maximum number of impression counts for the first advertisement;
   setting a prescribed value of being reached based on the first view location being more apt than the one or more other view locations to approach the maximum number of impression counts for the first advertisement;
   determining, based on the number of impression counts, whether the maximum number of impression counts for the first advertisement is within the prescribed value of being reached; and
   upon determining that the maximum number of impression counts for the first advertisement is within the prescribed value of being reached,
      (a) removing the first advertisement from the first view location; and
      (b) assigning, with a computing device executing code, a second advertisement to the first view location in a manner that maximizes respective numbers of impression counts for each of the first advertisement and the second advertisement up to a respective maximum number of impression counts.

2. The method of claim 1, wherein determining when the first advertisement qualifies as on screen comprises calculating whether a threshold percentage of an area of the first advertisement appears on screen.

3. The method of claim 1, further comprising placing multiple advertisements in respective first view locations and recording an asset name for each advertisement and its corresponding first view location.

4. The method of claim 1, wherein assigning the second advertisement to the first view location comprises reassigning the first advertisement from the first view location to a second view location.

5. The method of claim 4, wherein the second advertisement was initially located in the second view location prior to being assigned to the first view location.

6. The method of claim 1, wherein the second advertisement comprises an advertisement that has a minimum number of impression counts relative to one or more other advertisements.

7. The method of claim 1, wherein determining when the first advertisement at the first view location qualifies as on screen comprises determining a view count of the first advertisement which represents a number of copies of the advertisement that appear on screen at the same time and wherein calculating the number of impression counts for the first advertisement comprises factoring in the view count.

8. The method of claim 1, wherein the first advertisement comprises a plurality of instances of the first advertisement, each of which is placed at one of a plurality of view locations throughout the video game, wherein the second advertisement comprises a plurality of instances of the second advertisement, each of which is placed at one of the plurality of view locations throughout the video game, and wherein assigning the second advertisement comprises assigning the second advertisement to each of the plurality of view locations where the first advertisement was located.

9. The method of claim 1, wherein assigning the second advertisement comprises removing the first advertisement from the video game.

10. The method of claim 1, wherein the first advertisement and the second advertisement are each reassigned to respective new view locations based on a determination that at least one of the first advertisement and the second advertisement is within a prescribed value of reaching a maximum number of impression counts for the at least one of the first advertisement and the second advertisement.

11. The method of claim 1, wherein assigning the second advertisement comprises assigning an elapsed time for the second advertisement to the first view location so that the elapsed time for the second advertisement is associated with the second advertisement upon assignment of the second advertisement to the first view location.

12. The method of claim 1, further comprising receiving only the first advertisement and the second advertisement from an ad server on account of one or more constraints in relation to a number of advertisements that can be received.

13. The method of claim 1, wherein setting a prescribed value comprises setting the prescribed value based on one or more factors that impact a visibility of the first advertisement at the first view location.

14. The method of claim 13, wherein at least one of the one or more factors that impact the visibility of the first advertisement at the first view location comprises a skill level of a player playing the video game, the skill level of the player being operative to impact the visibility of the first advertisement at the first view location as a result of navigating through the video game in a manner that causes increased or prolonged exposure to the first advertisement.

15. The method of claim 13, wherein at least one of the one or more factors that impact the visibility of the first advertisement at the first view location comprises a relative position of the first view location along a navigational route of the video game.

16. The method of claim 1, wherein the first view location is identified based on the one or more factors that impact the visibility of the first advertisement at the first view location.

17. A method for dynamically reassigning in-game advertisements, the method comprising:
placing a plurality of advertisements at respective initial unique view locations within a video game;
for each advertisement:
determining when the advertisement qualifies as being on screen;
calculating a period of time that the advertisement is on screen;
calculating a number of impression counts for the advertisement, the number of impression counts comprising the period of time that the advertisement is on screen divided by an impression count threshold value, the impression count threshold value reflecting an amount of time during which the advertisement is viewable within the video game that qualifies as an impression of the advertisement;
identifying one view location as a location that is more apt than one or more other view locations to approach a maximum number of impression counts for the advertisement;
setting a prescribed value of being reached based on the one view location being more apt than the one or more other view locations to approach a maximum number of impression counts for the advertisement; and
determining, based on the number of impression counts, whether the maximum number of impression counts for the advertisement is within the prescribed value of being reached, the prescribed value being set based on a visibility of the advertisement at a respective initial unique view location; and
upon determining that the maximum number of impression counts for the advertisement is within the prescribed value of being reached, reassigning, with a computing device executing code, the respective initial unique view locations of at least two advertisements in a manner that maximizes the respective numbers of impression counts for each of the advertisements up to a respective maximum number of impression counts.

18. The method of claim 17, wherein each of the respective initial unique view locations comprises a specific area on one screen for placement of advertisements.

19. The method of claim 17, further comprising receiving only the at least two advertisements from an ad server on account of one or more constraints in relation to a number of advertisements that can be received.

20. The method of claim 17, wherein each of the one view location and the one or more other view locations are identified based on the one or more factors that impact the visibility of advertisements at the respective view locations.

* * * * *